Aug. 27, 1935.  G. M. HEFNER  2,012,759
SPECTACLE TEMPLE
Filed Sept. 7, 1934
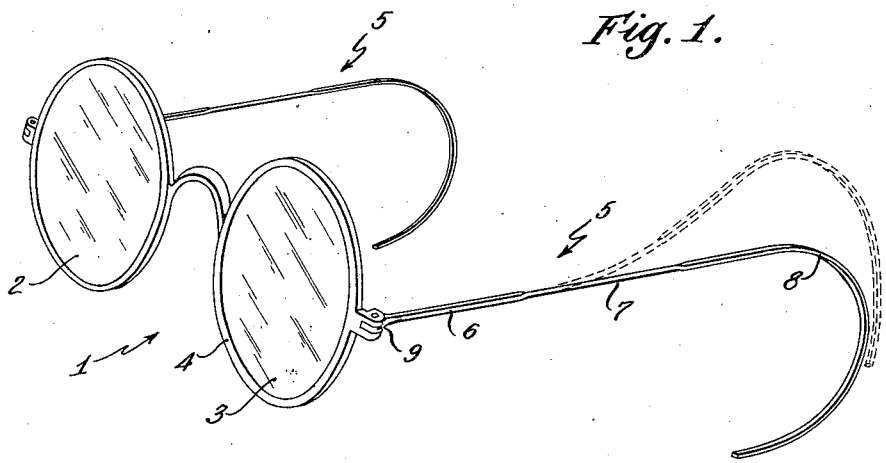
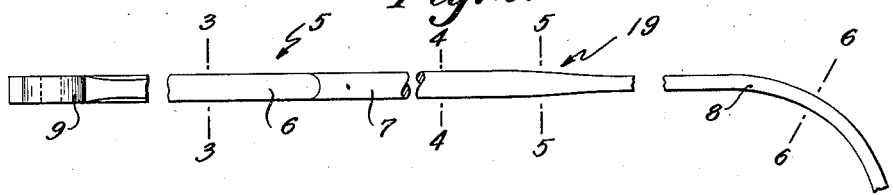
 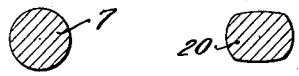  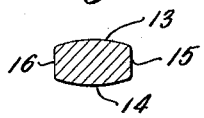
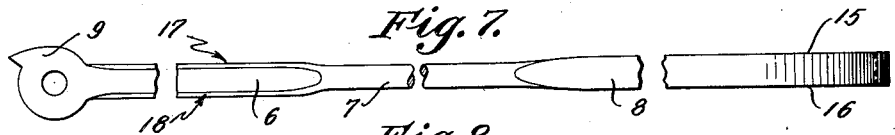
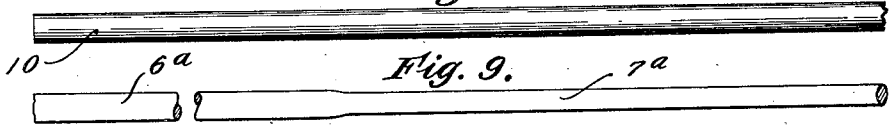
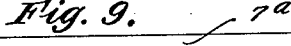
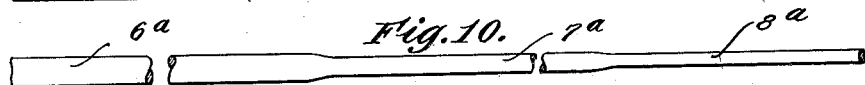
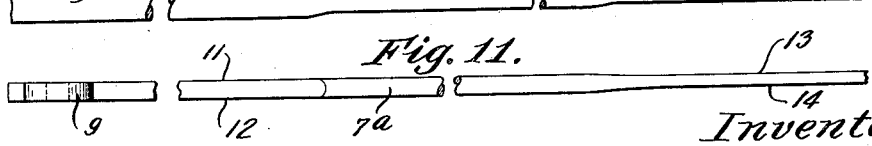
Inventor,
George M. Hefner,
by Roberts Cushman Woodbury
Attys.

Patented Aug. 27, 1935

2,012,759

UNITED STATES PATENT OFFICE 2,012,759

SPECTACLE TEMPLE

George M. Hefner, Providence, R. I., assignor of one-half to Paul Potvin, Providence, R. I.

Application September 7, 1934, Serial No. 743,061

4 Claims. (Cl. 88—52)

This invention pertains to spectacle temples, and relates more particularly to an improved spectacle temple of the hooked type. The hooked type temple is recommended by many opticians and is demanded by many wearers since when properly made and fitted it securely holds the lenses in proper position and prevents the bridge piece from slipping down on the wearer's nose. However, to be acceptable to the wearer, it is substantially necessary to make the hooked end of the temple quite flexible so that it may readily be passed over and around the ear in donning the spectacles, and on the other hand, in order to avoid discomfort to the wearer, the surface of the hooked portion which embraces and presses against the ear should be of substantial width in a horizontal direction. Temples consisting of a plain wire of circular section bent to form the hook portion, must be of such small diameter, in order to obtain the desired flexibility, that they tend to cut into the ear and to cause discomfort, and wire of such small diameter is easily bent and distorted so that the temple fails to function properly after a very short period of use. In the effort to avoid these difficulties it has been proposed to make the hook portion as a separate member of a larger diameter than the temple proper and to attach the hook portion by solder or otherwise. This hooked portion of larger diameter has commonly been made from a coil of very fine wire wound to provide an outside diameter of the desired dimensions. While such a coil may have the desired flexibility and diameter it does not meet all of the other requirements. For example, such a coil, made of the extremely fine wire requisite for the purpose, will not long retain the curvature imposed upon it in fitting the spectacles, but soon tends to straighten or to assume an irregular shape so that the spectacles are no longer held up at the proper point on the nose or may even be held in a laterally tilted position, to the great detriment of the wearer's vision. Furthermore, the attachment of the coil by means of solder to the end of the temple proper usually draws the temper or otherwise injures the wire of the coil at this point so that it tends to bend sharply at the joint when the spectacles are donned or doffed, and may eventually break off. This fact is so well recognized that opticians frequently warn their patients to take care not to bend the temple sharply at this point. Moreover, the manufacturing cost of the coil itself and of attaching the coil to the temple proper is substantially greater than when a single unitary length of material is employed. Furthermore, the fine wire of which the coil is made usually has an extremely thin plating or coating of gold or silver, and after a short period of use this wears away, exposing the base metal to view, while the interstices of such a coil permit lodgment of organic substances not at all desirable from a sanitary standpoint.

The principal object of the present invention is to provide a spectacle temple having a hooked end of such cross-sectional shape that it will be comfortable to the wearer; so flexible that it may be donned or doffed readily; but which at the same time has so high an elastic limit and is so resilient that it will retain the contour imposed during fitting throughout a long period of use. A further object is to provide a spectacle temple having the above described characteristics and which may be made cheaply and easily; which may be made of a material that will not tarnish or lose its surface finish readily; and to provide a temple having a hook portion of sanitary character free from cracks or crevices in which dirt might collect.

With these and other objects in view I have provided the improved temple more fully described hereinafter, one embodiment of which is illustrated by way of example in the accompanying drawing in which Fig. 1 is a perspective view of a pair of spectacles provided with temples made in accordance with my invention;

Fig. 2 is a side elevation of my improved temple, with certain parts broken away, and to large scale;

Figs. 3, 4, 5 and 6 are transverse sections, to larger scale, substantially on the lines 3—3, 4—4, 5—5 and 6—6, respectively, of Fig. 2;

Fig. 7 is a plan view of the temple shown in Fig. 2; and

Figs. 8, 9, 10 and 11 are side elevations illustrating a series of steps which may conveniently be followed in preparing the temple of the present invention.

Referring to the drawing, the numeral 1 indicates a pair of spectacles embodying my present invention, said spectacles comprising the lenses 2 and 3 held in the frame 4 which has hinged thereto the temples 5 made in accordance with the present invention. Each of these temples 5 preferably comprises a forward portion 6, a side portion 7 and a hook or rear portion 8, the forward portion 6 being furnished with an enlarged head 9 to receive the pivot member of the hinge.

In preparing my improved temple I preferably proceed in accordance with the following steps, although I contemplate that my improved temple may be made in accordance with other modes of procedure. Referring to Fig. 8, I have illustrated a piece of round wire conveniently constituting the stock from which the temple is formed. This wire may be of any suitable material appropriate for the purpose, for example, brass, steel, silver or gold alloys, German silver, or of any of such materials plated or otherwise coated or covered with gold, silver, platinum or the like, but in any case such wire should have a smooth, preferably polished surface, and should be of a material which acquires a high elastic limit when cold worked, as for example, by drawing, rolling, or die pressing, so that the hooked portion, after it has been curved to the desired contour, may be highly retentive of such curvature.

Having provided a piece of wire 10 of the proper material and of a proper diameter, I first proceed (as for example by pressure between dies) to reduce this wire as illustrated in Fig. 9 so as to leave a portion 6ª of the original diameter and to provide a portion 7ª of a smaller diameter suitable for the side part of the completed temple. I then preferably further reduce this wire at one end to a still smaller diameter as shown at 8ª (Fig. 10) so that the cross-sectional areas of the portions 6ª, 7ª and 8ª progressively decrease, relatively to each other. In thus cold working the wire to reduce its diameter in the parts 7ª and 8ª, the material is hardened and its elastic limit is raised. The next step in the process conveniently consists in flattening the part 6ª so as to provide the substantially flat, parallel upper and lower surfaces 11 and 12, (Fig. 3) respectively, the vertical dimension of this forward portion of the temple as thus formed preferably being substantially equal to the diameter of the side portion 7. Concomitantly or subsequently to this flattening of the forward portion I upset the metal and properly shape it to form the head 9 which receives the pivot pin.

Either before or after the shaping of the forward part of the temple I flatten the part 8ª so as to provide the upper and lower surfaces 13 and 14 (Figs. 6 and 11). These surfaces may be flat and parallel, if desired, although I prefer to make these surfaces slightly curved as illustrated in Fig. 6 so that the cross section may more or less approach an oval shape, the major axis of the section being horizontal. Preferably, although not necessarily, the lateral edges 15 and 16 of this hook portion may be flat and parallel, but in any event I prefer that all of the corners be somewhat rounded to provide a good finish and to avoid discomfort to the wearer. In so shaping the portion 8ª, which is to constitute the hook end of the temple, I preferably reduce its vertical thickness substantially and thus increase its width to such an extent that the lateral surfaces 15 and 16 lie substantially in the same vertical planes as the lateral surfaces 17 and 18, respectively, of the forward portion of the temple. This is highly desirable, particularly as respects the surfaces 15 and 17, since for proper and effective fitting, it is desirable to have the surface 15 (which contacts with the side of the wearer's head behind the ear) in alignment with the edge 17. In flattening the part 8ª as above described, I preferably so work the metal that the cross section of the side portion 7 gradually merges in a long taper as shown at 19 into the cross section of the hook portion 8,— the section 20, as shown in Fig. 5, being intermediate between the circular section of the side member 7 and the horizontal oval of the hook portion 8. This long taper avoids any substantial tendency of the temple to break at the junction of the side portion with the hook portion and distributes the bend during donning and doffing of the spectacles over a substantial length of the temple. However, the major part of the hook portion is of uniform cross section.

Either simultaneously with or subsequentially to the flattening of the hook portion, for example in fitting the spectacles, the hook portion has imposed thereon a curvature in the vertical plane. This curvature of the hook portion is so performed as to stress the material beyond its elastic limit, it being noted that the flattening of the hook portion as above described, as by rolling or die pressing, has further raised the elastic limit so that the metal is hard, dense and highly resilient. However, since this metal of the hook portion is relatively thin in a vertical direction, it is quite flexible, although very retentive of the curvature which is impressed thereon, while at the same time its greater dimension horizontally effectually maintains the imposed curvature in the vertical plane and avoids twist and deformation laterally during use. It will be noted that this temple, made out of a unitary piece of material, does not necessitate any soldering or other operation which unduly heats the metal so as locally to destroy its temper or hardness, while, on the other hand, the successive cold workings of the metal as above referred to, raise its limit of elasticity and greatly increase its resiliency and capability of retaining the shape finally imposed thereon. Furthermore, the material has a smooth surface devoid of cracks or crevices, and by reason of the shape of the temple at its successive sections as above described, the flexing of the temple necessary in donning the spectacles, is distributed over a very substantial part of the temple, as illustrated in broken lines in Fig. 1, so that there is little tendency for the temple to break or to be permanently bent out of its intended shape.

For convenience in description I have used the terms "vertical" and "horizontal" herein as applying to the temple when in the position it occupies in ordinary use, but with the understanding that these terms are only so employed in a relative sense and for ready reference.

I claim:

1. A spectacle temple consisting of a single unitary piece of metal, said temple having a forward portion, a side portion and a hook portion, the cross-sectional area of the successive portions each being less, respectively, than that of the portion preceding it, the hook portion being curved in a vertical plane and having its major dimension horizontal, the material of the hook portion being hardened by cold working and being flexible, resilient, and highly retentive of its vertical curvature.

2. A spectacle temple consisting of a single unitary piece of material, said temple comprising a forward portion, a side portion and a hook portion, the cross-sectional area of the hook portion being less than that of the forward portion, the horizontal dimension of the hook portion, in transverse section, being substantially equal to that of the forward portion, the hook portion being of work-hardened material sufficiently flexible to permit ready donning but having a high elastic limit such that it is retentive of its vertical curvature.

3. A spectacle temple consisting of a single integral length of metal, said temple comprising a forward portion, a side portion and a hook portion, the cross-sectional areas of the forward portion and of the side portion being greater than that of the hook portion, the lateral edges of the hook portion lying substantially in the same vertical planes as the lateral edges of the forward portion, the cross-sectional shape of the side portion merging gradually and without any abrupt shoulder into the cross-sectional shape of the hook portion, the material of the latter being work-hardened and of a high elastic limit but being so flexible as to permit the spectacles readily to be donned by the user.

4. A spectacle temple consisting of a single integral length of metal having a smoothly finished outer surface substantially devoid of crevices, said temple comprising a side portion and a hook portion, the cross-sectional area of the hook portion being less than that of the side portion, the cross section of the hook portion being substantially oval with its major axis substantially horizontal and merging gradually, and without an abrupt shoulder, into the cross section of the side portion, the material of the hook portion being flexible and of a high elastic limit and being stressed beyond its elastic limit to a predetermined curvature in the vertical plane.

GEORGE M. HEFNER.